Dec. 11, 1962  R. BOEKEMEIER  3,068,074
ANGLE VALVED MIXER
Filed Dec. 2, 1958  2 Sheets-Sheet 1
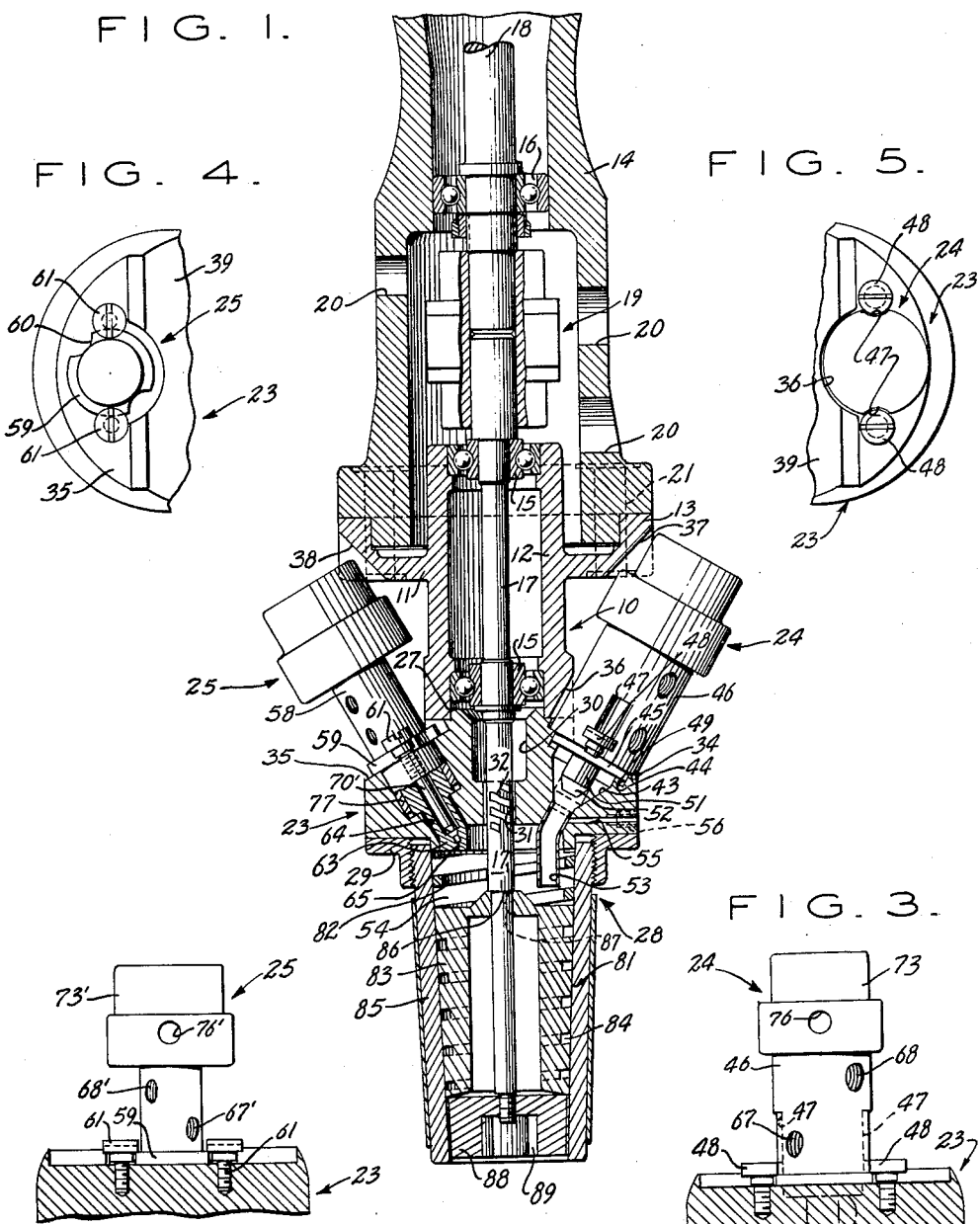
INVENTOR.
RALPH BOEKEMEIER
BY
ATTORNEYS Dec. 11, 1962     R. BOEKEMEIER     3,068,074
ANGLE VALVED MIXER
Filed Dec. 2, 1958                 2 Sheets-Sheet 2
FIG. 7.    FIG. 6.    FIG. 8.
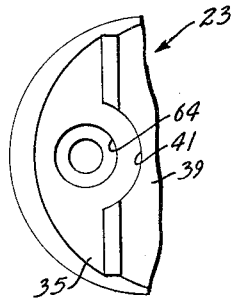
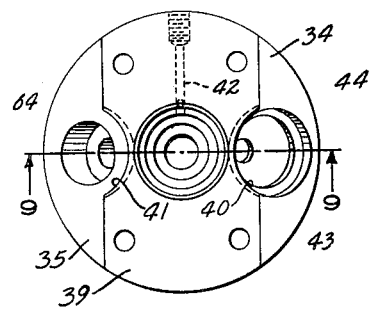
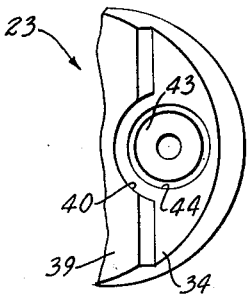
FIG. 9.
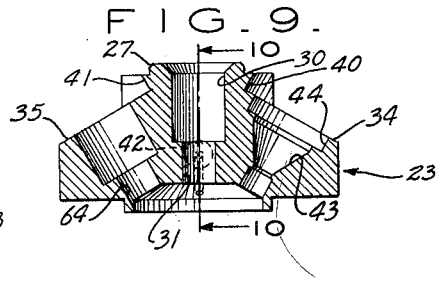
FIG. 10.
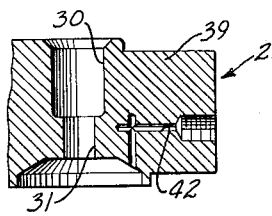
FIG. 11.
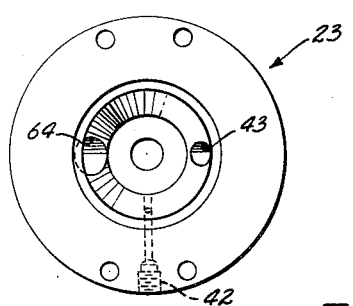
FIG. 12.     FIG. 13.
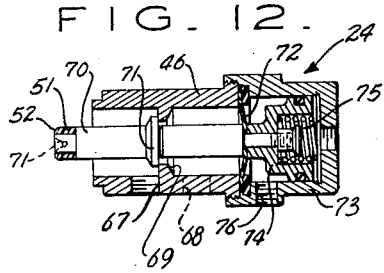
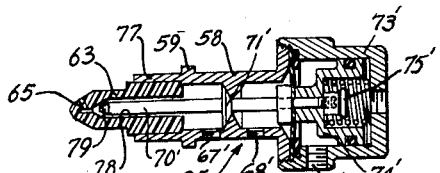
INVENTOR.
RALPH BOEKEMEIER
BY Whittemore, Hulbert
Belknap
ATTORNEYS

United States Patent Office 3,068,074
Patented Dec. 11, 1962

3,068,074
ANGLE VALVED MIXER
Ralph Boekemeier, Detroit, Mich., assignor to Mechanical Handling Systems, Inc., Detroit, Mich., a corporation of Michigan
Filed Dec. 2, 1958, Ser. No. 777,667
10 Claims. (Cl. 23—252)

The present invention relates to an improved recirculatory type mixer unit for use in the production of molded articles of a foamed elastomeric latex, synthetic resin or like plastic composition, in which production a basic prepolymer such as a urethane polymer or the like is vigorously mixed with a liquid catalyst or other reacting agent just prior to discharge, as to a forming mold, in an aerated and expanded, highly foamy state. As is known in the manufacture of individual cushion and like articles, as distinguished from continuous lengths or slabs, it is desirable to employ a recirculating or recycling type of mixer enabling the flow of the foam product to be interrupted without consequent drip as a filled mold is removed for curing and the next mold advanced into filling position.

A general object of the invention is to provide a recycling mixer unit as described whose component parts are very easily dismantled for cleaning, and which is very simple, compact and economical as to such parts.

A further general object is to provide a prepolymer and catalyst mixing unit of the sort described, in which improved provisions of a very simple yet effective nature are made to seal individual prepolymer and catalyst valve and discharge assemblies in relation to a valve manifold or housing to which they are applied; as well as to internally seal these sub-assembly units as between their respective liquid discharge and recirculating chambers and pneumatic operating cylinders or chambers.

In another respect it is an object to provide a mixer having improved provisions for obtaining an optimum initial distribution of the catalyst liquid into the relatively viscous prepolymer, and with a minimum splash of the mixed ingredients at the outlet nozzle of the mixer.

It is a further and more specific object to provide an improved mixer unit in which the prepolymer and catalyst, or equivalent fluids to be mixed, are valved into the valve housing of the mixer unit through special three-way valves. For the aforesaid end of obtaining optimum initial distribution of the catalyst, the outlet port of the catalyst valve is formed in an internal valve seat in a part of the valve unit, and is disposed angularly, enabling the adjustment of the direction of the catalyst outlet jet by simply rotating the port carrying part.

Another specific object is to provide a mixer in which, as distinguished from the catalyst valve, the prepolymer valve unit has its control valve engaged against the valve manifold or housing as a seat, with a protruding feeder tube to direct the flow of prepolymer into the mixing chamber of the mixer.

Yet another specific object is to provide a mixer as described, in which a mixing rotor is driven by a shaft suitably journalled on bearings well removed from the area of the mixing chamber; and in which the shaft is sealed as it enters the valve manifold by a non-contact type of seal eliminating wear and maintenance problems. As herein shown, the seal is provided by a helix on the shaft in its zone of reduced clearance entry to the valve manifold.

A further specific object is to provide a mixer in which the respective prepolymer and valve subassemblies or units, while providing dead tight seals at their respective valve manifold and internal valve seats, still permit low breakaway forces to unseat the same, as by the use of seat engaging elements of a suitable synthetic plastic material such as Teflon.

Another object is to provide mixer structure as described in which all components of the main assembly and of the individual sub-assemblies are devised for extremely quick and easy disassembly for access and cleaning.

The foregoing as well as other objects will become more apparent as this description proceeds, especially when considered in connection with the accompanying drawings illustrating the invention, wherein:

FIG. 1 is a fragmentary view of the improved mixer of the invention, being in vertical axial section through the latter and having certain parts broken away and in section to illustrate details;

FIGS. 2 and 3 are, respectively, fragmentary views in side elevation of the respective catalyst and prepolymer valve units or sub-assemblies of the mixer, as applied to the valve manifold or housing of the latter, with such manifold partially shown in section;

FIGS. 4 and 5 are, respectively, top plan views of the catalyst valve and prepolymer valve units, as viewed in the direction of their inclined axes and toward the valve manifold;

FIG. 6 is a top plan view of the valve manifold or housing, in the direction of the axis of the mixer as a whole;

FIGS. 7 and 8 are, respectively, plan views of the portions of the manifold which respectively receive the catalyst and prepolymer valve units or sub-assemblies;

FIG. 9 is a view of the valve housing along section line 9—9 of FIG. 6;

FIG. 10 is a fragmentary section of the manifold along line 10—10 of FIG. 9;

FIG. 11 is a bottom plan view of the valve manifold;

FIG. 12 is a view in axial section through the prepolymer valve unit; and

FIG. 13 is a similar view in axial section through the catalyst valve unit.

Referring to FIG. 1, the reference numeral 10 generally designates a tubular shaft and bearing housing provided between its top and bottom extremities with a radially projecting annular flange 11 integral with its housing body 12. The flange 11 is formed to provide an upwardly extending annular wall 13, between which and the body portion 12 the lower end of a spreader support member 14 is piloted. It is to be understood that the support 14 is equipped with suitable means to sustain the same in predetermined position above the path of travel of a series of molds into which the mixer is to discharge the foamed prepolymer compound.

Housing 10 is provided adjacent the top and bottom thereof with a pair of ball bearings 15, and the spreader support 14 is equipped with a similar ball bearing 16 in vertically spaced relation thereabove. Bearings 15 journal a vertical rotor shaft 17 within housing 10, and the bearing 16 similarly journals the lower end of a suitable drive shaft 18, which is drivingly connected to rotor shaft 17 by means of an appropriate conventional coupling 19 within the support 14. The latter has suitable openings 20 for access to the coupling and bearings and it is fixedly secured to the housing flange 13, as piloted by the latter, by means of a plurality of bolts 21. The reference numeral 23 generally designates a valve manifold or housing of the mixer; while reference numeral 24 generally denotes a prepolymer valve unit, and the reference numeral 25 a catalyst valve unit, both hereinafter described in greater detail. The upper end of the valve manifold 23 is piloted at 27 within the lower end of shaft and bearing housing 10, just beneath the lower ball bearing 15; and the lower end of housing 23 has applied thereto a rotor unit, generally designated 28, of the type illustrated and more fully described in my copending application Serial No. 777,668, filed concurrently herewith. For this purpose, a flanged ring 29 is suitably secured to the lower surface of the valve manifold 23, the rotor unit being threadedly received within the annular depending flange of ring 29.

The valve manifold 23 is preferably formed as a unitary casting of circular outline, having a central bore 30 through which the lower end of the mixer rotor shaft 17 extends. This bore is restricted in diameter at 31, in which zone the shaft 17 is milled to provide an integral helix 32. This helix, passing with relatively small clearance through the restricted bore 31, serves as a seal to prevent the upward flow of fluids discharged to the mixing chamber of rotor unit 28 into the shaft and bearing housing 10. Wear and seal maintenance considerations and cost are eliminated by the use of this non-contact type of seal.

FIGS. 2 through 11 may be referred to in conjunction with FIG. 1 for structural features of the valve manifold or housing 23. It is provided, on either side of its top center portion, with a pair of flat, downwardly and outwardly inclined surfaces or lands 34, 35, on which the respective prepolymer and catalyst valve units 24, 25 are mounted in flatwise engagement. As shown in FIGS. 1, 4 and 5, the lower extremity of the tubular body 12 of bearing housing 10 is arcuately recessed at 36, at an angle to its axis, to provide space to accommodate the inclined prepolymer valve unit 24. To the same general end, the top flange 13 of the housing 10 is cut away at 37 and 38 on its opposite sides to provide accommodation clearance for the outer ends of the respective units 24, 25.

In the zone between the respective lands 34, 35, the upper surface 39 of the valve manifold 23 is flat, save for the annular upright formation by which the bearing housing 10 is piloted at 27, and it is in this zone that the axial bore 30 of housing 23 is formed, midway between the two sides of surface 39. As shown in FIGS. 5 and 6, the surface 39 is laterally recessed at 40 and 41 to receive the respective valve units 24, 25, as applied to the respective inclined lands or surfaces 34, 35.

As shown in FIGS. 6, 9, 10 and 11, a lateral passage 42 may be formed in manifold or housing 23 (communicating with the mixing chamber to be described) for the reception of a fluid line by which the interior of the mixing chamber and a mixing rotor therein may be flushed and cleaned.

The valve manifold 23 is formed, on and normal to its inclined land 34, to provide a bore presenting a conical valve seat 43 of substantial diameter and axial extent, and is counterbored at 44 to receive a shoulder 45 on the adjacent end of prepolymer valve unit 24. The external cylindrical wall 46 of valve unit 24 is milled to provide, on its diametrically opposite surfaces, arcuate ways 47. These ways terminate short of the lower or inner extremity of the wall 46, and are adapted to receive the heads of a pair of machine screws 48 threaded into the land or surface 34, as shown in FIGS. 3 and 5. Thus, in downwardly engaging the unmilled portion of the wall 46 beneath its arcuate milled ways 47, the heads of the screws serve to clamp the prepolymer valve unit 24 in place on the valve manifold 23. As thus clamped, the shoulder 45 of the unit compresses a sealing washer 49 to seal the assembly at this point; and unit 24 is locked against rotation.

Prepolymer valve unit 24, the internal structure of which is to be hereinafter described in detail, includes an outlet valve member 51 of a suitable synthetic material to obtain an improved dead tight seal of its conical nose portion 52 against the integral conical seat 43 of the valve manifold, when in the dotted line position of FIG. 1 of the drawings. A stainless steel curved discharge feeder tube 53, applied in communication with the valve seat 43, extends into the mixing chamber 54 of the rotor unit 28 to controlledly direct the prepolymer into the latter. This tube is secured in place by a plug 55 in the wall of valve manifold 23, a set screw 56 serving in turn to hold the plug. The arrangement is such that the feeder tube 53 is readily removed for cleaning and, when removed, affords easy access to the prepolymer discharge valve seat 43.

The catalyst valve unit 25, internal details of which are also to be hereinafter described in greater detail, includes a cylindrical body wall 58 provided with an annular outer flange 59 which engages flatwise against the inclined surface or land 35 of the valve manifold 23, opposite the land 34 upon which the prepolymer valve unit 24 is mounted. At diametrically opposite points, the flange 59 is milled to provide arcuate recesses 60, and the heads of machine screws 61 threaded into the valve manifold normally engage downwardly against the flange 59, as shown in FIG. 1, to hold the catalyst valve unit 25 in place. However, when it is desired to remove this unit for cleaning or other attention, the screws 61 may simply be backed off and the unit rotated a few degrees to line their heads with the respective recesses 60, whereupon the valve unit 25 may be axially lifted away from the manifold.

The valve unit 25 includes a conical nose portion 63 which is coaxially received in an inclined bore 64 formed in the valve manifold 24. This nose portion extends angularly into the mixing chamber 54, and has a discharge orifice 65 of small bore size formed therein, but at an angle to the axis of the valve unit 25 itself. Accordingly, an accurate control of the direction of the catalyst discharge jet through orifice 65 may be had by simply rotating the unit to the extent desired about its own axis, then reclamping it in place.

It will be appreciated that, with the valve units 24, 25 thus compactly mounted on diametrically opposite sides of the axis of shaft 17, their weight is properly distributed to balance the mixer.

Referring now to FIG. 12 of the drawings for structural details of the prepolymer valve unit 24, the cylindrical wall 46 thereof is formed to provide a pair of radial passages 67, 68, on either axial side of an internal annular valve seat restriction 69 thereof. The passage 67 is an intake passage or port, to which a suitable line (not shown) is applied to supply the prepolymer liquid in question to the interior of the valve unit. The passage 68 is a return or recirculating passage or port, through which the liquid is returned to a source of supply, as when the mixer is not in use during an indexing of one mold therefrom and another mold thereto. A valve stem 70 provided with an annular sealing rib 71 is mounted for axial movement within the unit 24, and the valve discharge member 51 is applied to the outer end of the stem 70, for sealing engagement with the integral seat 43 of valve manifold 23. This manner is in the form of a conically ended nose or sleeve, and in order to obtain a dead tight seal against the seat 43 with low breakaway forces required to unseat the valve, the member 51 is formed of a suitable synthetic plastic, such as Teflon, being held on a restricted outer portion of the stem 70 by a screw 71.

The rear portion of stem 70 has a flexible sealing diaphragm 72 applied thereto and externally clamped between the valve wall 46 and a cylinder member 73 threaded on said wall. The internal portion of the diaphragm is clamped to the stem 70 by a piston 74 which slides in sealed relation to the internal wall of cylinder 72, a coil compression spring 75 serving to urge the piston and stem 70 to the left as viewed in FIG. 12. For improved sealing qualities, the surface of the diaphragm facing the valve manifold 23 is faced with a synthetic plastic such as Teflon, backed by a fabric reinforced rubber sheet.

Thus, it is seen that spring 75 normally urges the valve stem 70 to the left, in a way to engage the sealing nose 51 thereof against the valve manifold seat 43, and to disengage the sealing element 71 from the seat 69, thus permitting recirculating or return flow of the prepolymer. The stem is moved in the opposite direction by pneumatic pressure applied to the interior of cylinder 73 through a port of passage 76, thus to open the valve for the discharge of prepolymer to the manifold and to seal off the return or recirculatory line of flow.

The construction of the catalyst valve unit 25, as shown in FIG. 13, is very similar to that of the prepolymer valve unit of FIG. 12, hence corresponding reference numerals, primed, are employed to designate corresponding parts, and further description thereof is dispensed with. The integral valve seat nose 63 is formed of a molded synthetic plastic material such as Teflon for the desirable sealing and easy breakway qualities mentioned above. It is fixedly received in an annular portion 77 of the wall 58, outwardly of the flange 59, and has an integral axial bore 78 which axially receives the valve stem 70' with sufficient radial clearance to permit the axial flow of catalyst therebetween. In this case, the valve seat is integrally and internally molded at 79 within the nose 63, and the stem 70' serves as a direct sealing element engageable and disengageable therewith. Action of the catalyst valve unit 25 is the same as described above in connection with the valve unit 24, hence further description is unnecessary.

The rotor unit 28 (FIG. 1) includes a rotary mixer or agitator 81 of a plural stage construction generally as illustrated and described in my copending application identified above. Mixer 81 includes an open type helix 82 connected at its bottom to the top of a frusto-conical rotor body 83, which body has a helical passage or groove 84 formed externally thereon. The passage 84 opens upwardly to the mixing chamber 54 and downwardly to the open discharge mouth of a nozzle jacket 85, which has a relatively close fit in respect to the helix member 82 and rotor body 83. Jacket 85 is threadedly connected upwardly into the ring 29.

The rotor body 83 is axially apertured to fit on the lower end of shaft 17, engaging upwardly against a shoulder 86 on the latter, and being drivingly connected thereto by a spline or key 87. The lower end of shaft 17 threadedly engages a retainer plug 88 of circular cross section axially of the latter, and the plug 88 bears upwardly against the lower end of rotor body to hold it axially. A hex shaped wrench seat 89 is formed axially of the threaded connection of retainer 88 to shaft 17 for the reception of a tool to tighten it or back it off.

It is believed that the operation of the improved mixer is clear from the foregoing description. The valve stems 70, 70' of the respective prepolymer and catalyst valve units are air pressure-shifted from a suitable source to open the communication of the respective agents to valve manifold 23, and are spring urged to shut-off position, upon cessation of pressure, establishing the respective return or recirculatory lines for the prepolymer and catalyst.

All components are dismantled and re-assembled with ease and speed, and with ready access to surfaces requiring cleaning. Sealing provisions are simple yet efficient; as for the prepolymer valve unit, it requires no special seat, which is furnished by the valve manifold itself, and as for the catalyst valve unit, the seat is cheaply and accurately formed therein in the molding of the member 63. Very accurate and efficient discharge of the liquids to the mixing chamber 54, particularly of the catalyst, is possible by the simplest sort of adjustment, characteristic of the simplicity of use and maintenance of the mixer as a whole.

What I claim as my invention is:

1. A mixer comprising means providing a mixing chamber axially receiving a mixing rotor, a valve manifold connected to said means and having an axial opening communicating with said chamber, a bearing device connected to said manifold, a shaft rotatably mounted by said bearing device and extending through said axial manifold opening to a driving connection with said mixing rotor, said shaft having an external helix formation in the zone of said opening in a relatively close tolerance radial relation to the latter and acting to afford a contact-free liquid seal in said zone when the shaft is rotated, said manifold being provided with valve bores spaced angularly about the axis of said shaft and opening to said mixing chamber, and valve units secured on said manifold and received in said respective bores, said units each including an inlet opening for the supply of material to said mixing chamber under the control of the unit.

2. A mixer comprising means providing a mixing chamber axially receiving a mixing rotor, a valve manifold connected to said means and having an axial opening communicating with said chamber, a bearing device connected to said manifold, a shaft rotatably mounted by said bearing device and extending through said axial manifold opening to a driving connection with said mixing rotor, said shaft having an external helix formation in the zone of said opening in a relatively close tolerance radial relation to the latter and acting to afford a contact-free liquid seal in said zone when the shaft is rotated, said manifold being provided with valve bores spaced angularly about the axis of said shaft and opening to said mixing chamber in inclined relation to said axis, one of said bores including a formation thereon to provide a static valve seat, and valve units secured on said manifold and received in said respective bores, said units each including an inlet opening for the supply of material to said mixing chamber under the control of the unit, one of said units including a valve element movable to engage said bore seat, the other valve unit including a hollow tubular valve seat member provided with a valve seat internally thereof and a discharge orifice opening to said mixing chamber at an angle to the axis of said seat member, for the adjustment of the direction of orifice discharge to said chamber by rotation of said seat member about its axis, and a valve element movable in said valve seat member for engagement with said seat to control flow through said orifice.

3. A recirculating mixer comprising means providing a mixing chamber axially receiving a mixing rotor, a valve manifold communicating with said chamber axially of said rotor, a shaft extending through said axial manifold opening to a driving connection with said mixing rotor, said shaft having an external helix formation in the zone of said opening in a relatively close tolerance radial relation to the latter and acting to afford a contact-free liquid seal in said zone when the shaft is rotated, said manifold being provided with valve bores spaced angularly about the axis of said shaft and opening to said mixing chamber in inclined relation to said axis, valve units secured on said manifold and received in said respective bores, each unit including an intake port and a movable valve element to control flow of fluid from the intake port through its associated bore, means to supply fluids to said intake ports of said valve units for discharge to said mixing chamber under control by the respective valve elements thereof, and means controlling movement of said respective valve elements, said respective valve units each being further provided with a recirculatory discharge port adapted to be communicated with the intake port thereof, a valve seat between the intake and recirculatory discharge ports, and a further valve element movable with the first named valve element thereof to control said last named valve seat.

4. A recirculating mixer comprising means providing a mixing chamber axially receiving a mixing rotor, a valve manifold connected to said means axially of said rotor and having an axial opening to said chamber, a shaft extending through said axial manifold opening to a driving connection with said mixing rotor, said manifold being provided with valve bores opening to said mixing chamber, one of said bores including a formation thereon to provide a static valve seat, a first tubular valve unit secured on said manifold and having an intake port and a movable valve element coaxially received in said one bore and engageable with said bore seat, a second valve unit secured on said manifold, said second valve unit including a hollow tubular valve seat member fixedly received coaxially in the other bore and provided with an intake port and an annular valve seat internally thereof and a discharge orifice opening to said mixing chamber at an angle to the axis of said seat member, for the adjustment of the direction of orifice discharge to said chamber by rotation of said seat member about its axis, and a valve element movable in said valve seat member for engagement with said internal valve seat to control flow through said orifice, means to supply fluids to said intake ports of said valve units for discharge to said mixing chamber under control of said respective valve elements, and means controlling movement of said respective valve elements, said respective valve units each being further provided with a recirculatory discharge port adapted to be communicated with the intake port thereof, an annular valve seat between the intake and recirculatory discharge ports, and a further valve element movable with said first named valve element thereof to control said last named valve seat.

5. A recirculating mixer comprising means providing a mixing chamber axially receiving a mixing rotor, a valve manifold connected to said means axially of said rotor and having an axial opening to said chamber, a shaft extending through said axial manifold opening to a driving connection with said mixing rotor, said shaft having an external helix formation in the zone of said opening in a relatively close tolerance radial relation to the latter and acting to afford a contact-free liquid seal in said zone when the shaft is rotated, said manifold being provided with valve bores spaced angularly about the axis of said shaft and opening to said mixing chamber in inclined relation to said axis, one of said bores including a formation thereon to provide a static valve seat, a first valve unit secured on said manifold and having an intake port and a movable valve element received in said one bore and engageable with said bore seat, a second valve unit secured on said manifold, said second valve unit including a hollow tubular valve seat member fixedly received in the other bore and provided with an intake port and a valve seat internally thereof and a discharge orifice opening to said mixing chamber at an angle to the axis of said seat member, for the adjustment of the direction of orifice discharge to said chamber by rotation of said seat member about its axis, and a valve element movable in said valve seat member for engagement with said seat to control flow through said orifice, means to supply fluids to said intake ports of said valve units for discharge to said mixing chamber under control of said respective valve elements, and means controlling movement of said respective valve elements, said respective valve units each being further provided with a recirculatory discharge port adapted to be communicated with the intake port thereof, a valve seat between the intake and recirculatory discharge ports, and a further valve element movable with the first named valve element thereof to control said last named valve seat.

6. A mixer comprising means providing a mixing chamber axially receiving a mixing rotor, a valve manifold mounted on said means and having an axial opening communicating with said chamber, a bearing device connected to said manifold, a shaft rotatably mounted by said bearing device and extending through said axial manifold opening to a driving connection with said mixing rotor, said manifold being provided with valve bores opening to said mixing chamber and provided with annular valve seats, and valve units secured on said manifold, said units each having an intake port and being received in said respective bores, one of said units including a hollow tubular valve seat member the axis of which is non-coaxial with that of said shaft, said seat member being provided with one of said valve seats internally thereof and a discharge orifice opening to said mixing chamber, and a valve element movable in said valve seat member on the axis of the latter for engagement with said last named annular seat to control flow through said orifice.

7. A mixer comprising means providing a mixing chamber axially receiving a mixing rotor, a valve manifold connected to said means and having an axial opening communicating with said chamber, a bearing device connected to said manifold, a shaft rotatably mounted by said bearing device and extending through said axial manifold opening to a driving connection with said mixing rotor, said manifold being provided with valve bores opening to said mixing chamber and provided with annular valve seats, one of said bores including a formation on said manifold to provide a static valve seat as one of said seats, and valve units secured on said manifold, said units each having an intake port and being received in said respective bores, one of said units including a valve element movable to engage said static seat, the other valve unit including a hollow tubular valve seat member the axis of which is non-coaxial with that of said shaft, said seat member being provided with the other seat internally thereof and a discharge orifice opening to said mixing chamber, and a valve element movable in said valve seat member on the axis of the latter for engagement with said last named annular seat to control flow through said orifice.

8. A mixer comprising means providing a mixing chamber axially receiving a mixing rotor, a valve manifold mounted on said means and having an axial opening communicating with said chamber, a bearing device, a shaft rotatably mounted by said bearing device and extending through said axial manifold opening to a driving connection with said mixing rotor, said manifold being provided with valve bores opening to said mixing chamber and provided with annular valve seats, and valve units secured on said manifold and received in said respective bores coaxially of the latter, said units each including a valve element received in the associated bore for movement on an axis non-coaxial with and at an angle to the axis of said manifold opening to and from sealing relation to said respective valve seats, said valve units each being provided with an inlet port for the supply of material to said mixing chamber under control of the unit, one of said units including a hollow tubular valve seat member provided with one of said valve seats internally thereof and a discharge orifice opening to said mixing chamber at an angle to the axis of said seat member, for the adjustment of the direction of orifice discharge to said chamber by rotation of said seat member about its axis, the valve element of said last named unit being movable in said valve seat member for engagement with said last named seat to control flow through said orifice.

9. A mixer comprising means providing a mixing chamber axially receiving a mixing rotor, a valve manifold connected to said means and having an axial opening communicating with said chamber, a bearing device, a shaft rotatably mounted by said bearing device and extending through said axial manifold opening to a driving connection with said mixing rotor, said manifold being provided with valve bores opening to said mixing chamber and provided with annular valve seats, one of said bores including a formation on said manifold to provide a static valve seat as one of said seats, and valve units secured on said manifold and received in said respective bores coaxially of the latter, said units each including a valve element received in the associated bore for movement on an axis non-coaxial with and at an angle to the axis of said manifold opening to and from sealing relation to said respective valve seats, said valve units each being provided with an inlet port for the supply of material to said mixing chamber under control of the unit, one of said units including a valve element movable to engage said static seat, the other valve unit including a hollow tubular valve seat member provided with the other seat internally thereof and a discharge orifice opening to said mixing chamber, the valve element of said last named unit being movable in said valve seat member for engagement with said last named seat to control flow through said orifice.

10. A recirculating mixer comprising means providing a mixing chamber axially receiving a mixing rotor, a valve manifold mounted on said means and communicating with said chamber axially of said rotor, said manifold being provided with valve bores and annular valve seats coaxial of the respective bores and opening to said mixing chamber, hollow tubular valve units secured on said manifold and received in said respective bores, each unit including an intake port and a movable valve element engageable coaxially with one of said valve seats to control flow of fluid from the intake port through its associated bore, means to supply fluids to said intake ports of said valve units for discharge to said mixing chamber under control by the respective valve elements thereof, and means controlling movement of said respective valve elements, said respective valve units each being further provided with a recirculatory discharge port adapted to be communicated with the intake port thereof, a further annular valve seat located coaxially of one of the respective first named seats between the intake and recirculatory discharge ports, and a further valve element movable with the first named valve element thereof to control said further valve seat.

References Cited in the file of this patent

UNITED STATES PATENTS

| | | |
|---|---|---|
| 2,643,183 | Efferson | June 23, 1953 |
| 2,665,197 | Rowland | Jan. 5, 1954 |
| 2,768,815 | Weaver | Oct. 30, 1956 |
| 2,868,518 | Corby et al. | Jan. 16, 1959 |
| 2,958,516 | Wall et al. | Nov. 1, 1960 |